Dec. 25, 1934. R. B. McILROY ET AL 1,985,259
STORM CHART
Filed Sept. 13, 1933  2 Sheets-Sheet 2
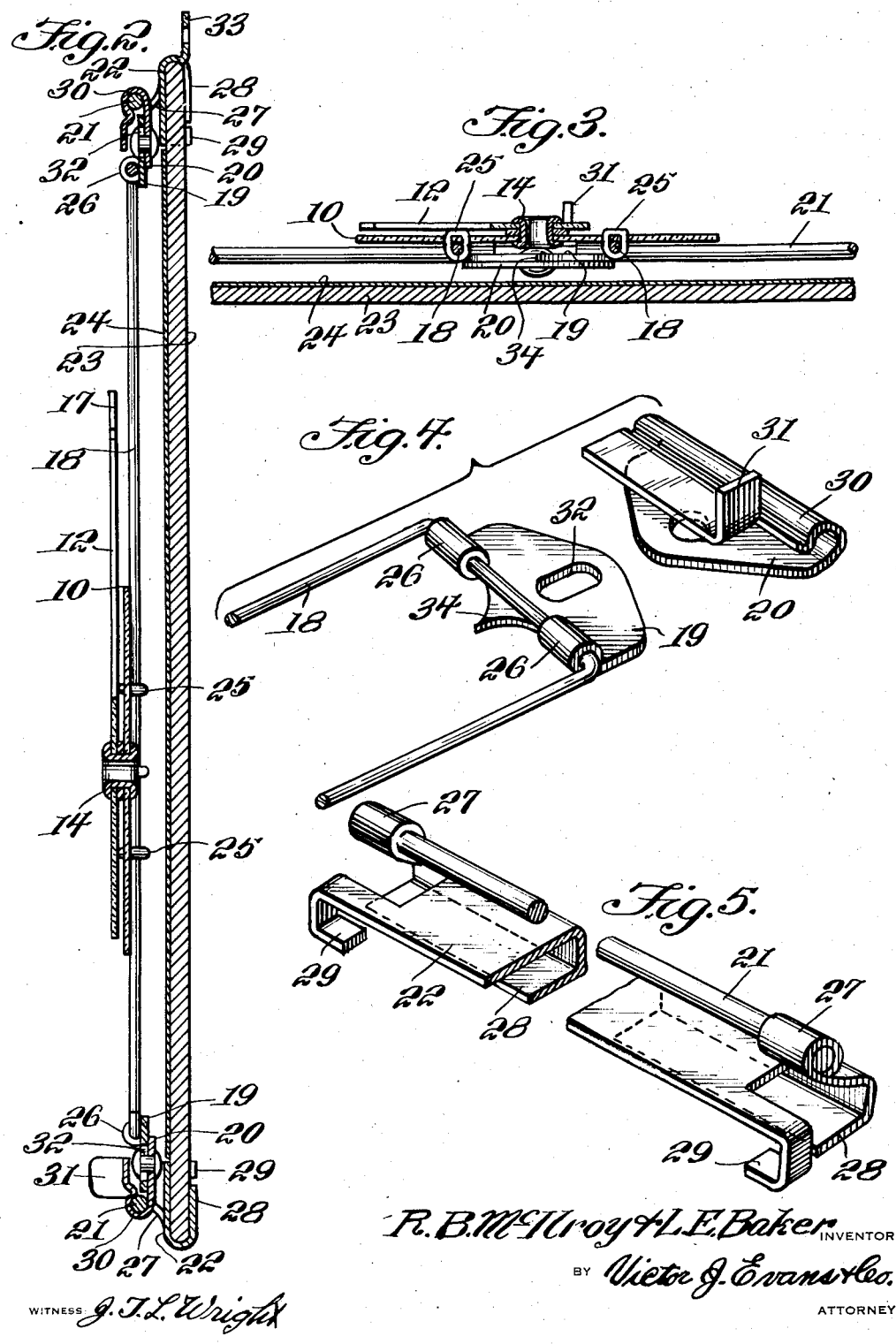

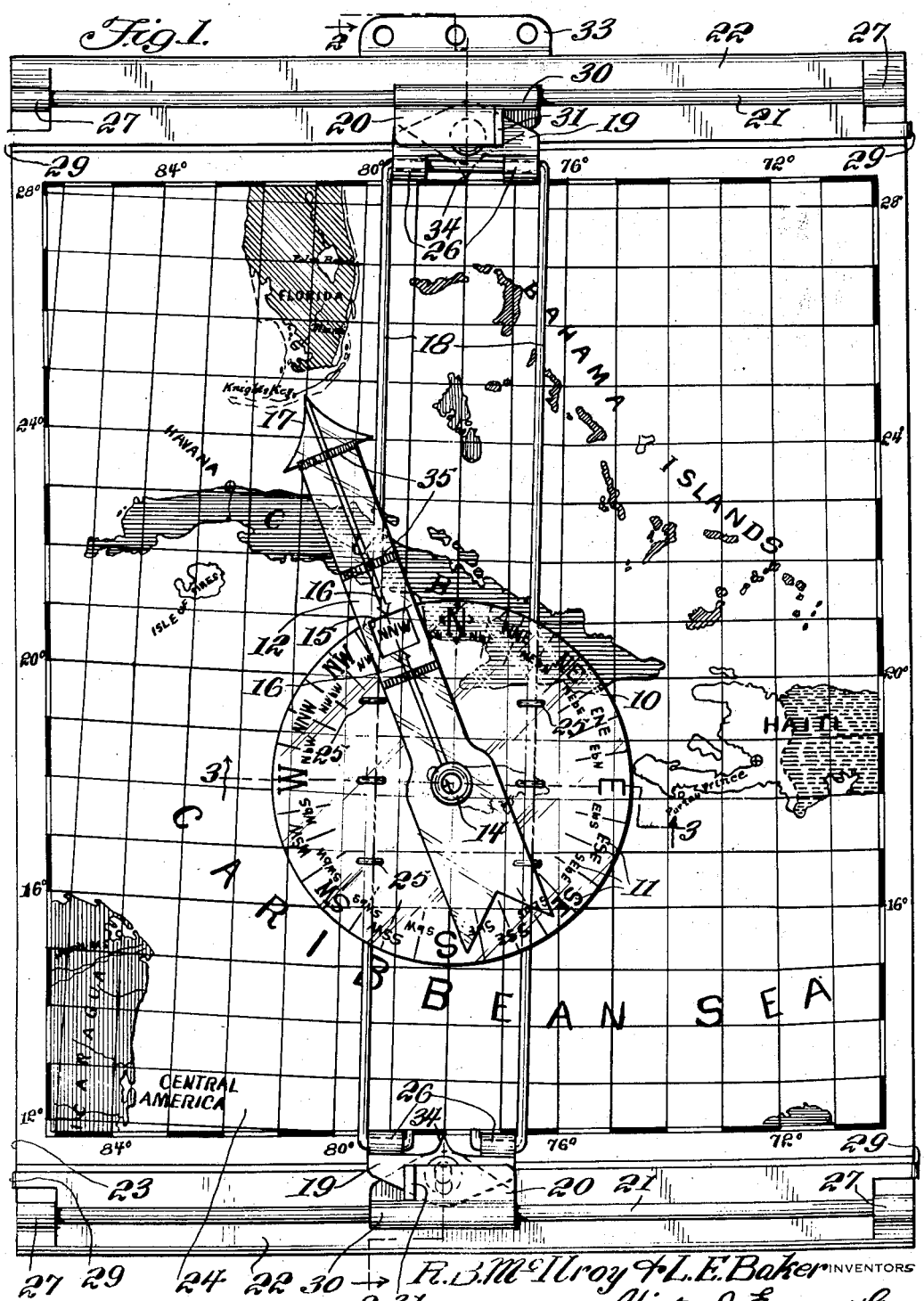

UNITED STATES PATENT OFFICE 1,985,259

STORM CHART

Rupert B. McIlroy and Leslie E. Baker, Moore Haven, Fla.

Application September 13, 1933, Serial No. 689,309

5 Claims. (Cl. 116—130)

The object of the invention is to provide a device for making a visual indication of the location of a hurricane or storm or meteorogical disturbance and indicating its course, so that the areas over which it will pass may be readily seen and the time of its reaching such areas indicated; to provide a device of the kind indicated which is adapted to receive a map and which comprises an element bearing the points of the compass and an indicator adjustable around the element, the element and its indicator being readily shiftable to any point on the map where the disturbance is known to exist and the indicator being adjustable to position it in the direction of movement of the disturbance; and to provide a device for the purpose stated which is of simple form and therefore susceptible of cheap manufacture.

With this object in view, the invention consists in a construction and combination of parts of which a preferred embodiment is illustrated in the accompanying drawings but to which embodiment the invention is not to be restricted. Continued use in practice may dictate certain changes or alterations and the right is claimed to make any which fall within the scope of the annexed claims.

In the drawings:

Figure 1 is a plan view of the invention.

Figures 2 and 3 are sectional views of the planes indicated by the lines 2—2 and 3—3 respectively of Figure 1.

Figure 4 is a collective perspective view of one of the compass disk frames and its accompanying slide.

Figure 5 is a perspective view, partly broken away, of one of the slide rails and its mounting bracket by which it is attached to or secured to the chart board.

The invention comprises a disk 10, preferably of transparent material, having its upper face inscribed with the thirty-two points of the compass, as indicated at 11, and an indicator 12 associated with the disk, the indicator having a pivotal mounting at the center of the disk, this pivotal mounting consisting of a hollow eyelet 14 passing through the indicator and the disk. The indicator is thus movable around the several points of the compass and is retained in any of its adjusted positions by the friction afforded as a result of the eyelet firmly gripping the disk and the indicator.

The indicator is formed with an opening 15 through which the points on the compass may be observed and is inscribed on its upper face with the arrows 16 of which one is directed inwardly from the outer or free end of the indicator and the other directed outwardly from the pivot point of the indicator. The arrow points terminate at the upper and lower edges of the window and are arranged in the axial center line of the indicator, so that the latter may be definitely positioned on any selected compass point of the disk.

The indicator extends materially beyond the periphery of the disk and terminates in an arrowhead 17.

The disk 10 is mounted for sliding movement up and down a frame composed of spaced parallel bars 18 which are connected with plates 19, the plates in turn being connected with slides 20 which traverse rails 21, the latter being carried by mountings 22 which are connected with the board 23 at the upper and lower edges of the latter. The board is designed to receive the map 24 which may be a map of any area in which the meteorological conditions are to be considered.

The sliding mounting between the disk and the bars 18 consists of loops 25 passed through the disk and arranged in surrounding relation to the bars. The loops are preferably four in number arranged so that two embrace each bar 18. The disk is thus prevented from any angular or turning movement but may be slid up and down the bars by reason of the fact that the loops impose only a frictional resistance to such movement. By reason of the disk thus being frictionally secured against sliding movement on the bars, it is easily retained in any adjusted position.

The bars 18 are elements of a heavy wire strand which is bent into rectangular form, the crosspiece connecting the two bars at one end being received in the curls 26 of one of the plates 19 and the terminals being similarly received in the corresponding curls of the other plate 19.

The rails 21 are received in the upstruck curled portions 27 of the mountings 22, the latter being formed with longitudinal flanges 28 which lie against the board 23 on the under face and being also formed with inturned ears 29 at their extremities which also are turned in against the under face of the board. When the map 23 is positioned on the board, the mountings rest upon the latter and thus hold it flat upon the board.

The slides 20 are formed with curled portions 30 which embrace the rails 21 and are likewise formed with upturned finger pieces 31 by means of which they may be moved longitudinally along the rails, so as to effect movement of the disk carrying frame transversely of the board.

Since the lines representing the meridians on the map vary in lateral spacing between the upper and lower edges of the board and since it is necessary to align the disk carrying frame with a particular meridian in the operation of the device, the upper and lower slides will never be the same distance from the one side edge of the board except on that meridian which, on a particular map, might be vertical with the lower edge of the board. The connections between the plates 19 and the slides 20 are therefore made pivotal and one of the plates 19 is provided with an elongated slot 32 as a part of its pivotal connection with its attendant slide, so that the slide and plate may move toward and away from each other, as the angularity between the slides and the disk carrying frame is increased or reduced.

One of the rail mountings 22 is provided with an extension 33 which may serve as a means for suspending the device on a wall when not in use or as a permanent wall mounting means.

In the operation of the invention, the map of the area with which the investigations are concerned is placed on the board. In the illustrated embodiment of the invention, there is shown a map of the Caribbean area, since, in this region of the earth, most of the tropical disturbances originate in this area. If a storm be reported, say, on the island of Haiti, the slides 30 are moved to the right by means of the finger pieces 31 until the disk carrying frame is over this area of the map. If the location of the storm be on the 72nd meridian, the slides are positioned to bring the indicators 34 with which they are formed in registration with the line representing this meridian on the map. The longitudinal center line of the disk carrying frame will thus be coincident with the 72nd meridian. If the latitude of the storm be the 21st parallel, the disk is slid along the frame to bring its center on the line representing the 21st parallel and when this condition of the disk obtains, the crossing point of the 72nd meridian and 21st parallel will be observable through the eyelet constituting the pivotal mounting between the disk and the indicator. But the direction of movement of the storm will be known from Weather Bureau reports and the indicator is adjusted on the disk to position it in the line of movement of the storm. It will thus be seen over what areas the storm will pass. The indicator is made of a width, according to the scale of the map used, to represent a territorial extent of approximately sixty miles which is the average width of the area traversed by a hurricane or equivalent disturbance. The indicator is made of a length to extend materially beyond the periphery of the disk and the total length from pivot point to the head 17 is directly proportional to the width, this length being divided by the cross-marking 35 into three sections each of which is twice the width of the indicator. Thus the spacing between the cross-markings 35 represents distances of one hundred and twenty miles in length. If the rate at which the storm be moving be known, the pointer will thus indicate its position at any time within a distance of three hundred and sixty miles traveled.

The invention having been described, what is claimed as new and useful is:

1. A device for the purpose indicated comprising a base having on its upper face a charted geographical area, a disk inscribed with the points of the compass, an indicator having a pivotal mounting on the disk at its center, and means for mounting the disk above the base for movement across the latter between any two opposite edges of the same, the disk mounting means comprising rails disposed adjacent opposite edges of the base, and a frame traversing said rails, the disk being slidably mounted on the frame for movement along the latter toward either of said rails, the frame having a sliding mounting on said rails.

2. A device for the purpose indicated comprising a base having on its upper face a charted geographical area, a disk inscribed with the points of the compass, an indicator having a pivotal mounting on the disk at its center, and means for mounting the disk above the base for movement across the latter between any two opposite edges of the same, the indicator extending materially beyond the periphery of the disk and having an opening in the zone of the compass points.

3. A device for the purpose indicated comprising a base having on its upper face a charted geographical area, rails disposed adjacent opposite side edges of the base, mountings for said rails embracing the edges of the base and retaining the chart, slides mounted on the rails, a frame spanning the slides and having pivotal connections with the latter, a disk having a sliding mounting on the frame and formed on its upper face with indications corresponding to the points of the compass, and an indicator having a pivotal mounting on the disk at the center of the latter.

4. A device for the purpose indicated comprising a base having on its upper face a charted geographical area, rails disposed adjacent opposite side edges of the base, mountings for said rails embracing the edges of the base and retaining the chart, slides mounted on the rails, a frame spanning the slides and having pivotal connections with the latter, a disk having a sliding mounting on the frame and formed on its upper face with indications corresponding to the points of the compass, and an indicator having a pivotal mounting on the disk at the center of the latter, said pivotal mounting consisting of a hollow rivet extending through the indicator and disk.

5. A device for the purpose indicated comprising a base having on its upper face a charted geographical area, rails disposed adjacent opposite side edges of the base, mountings for said rails embracing the edges of the base and retaining the chart, slides mounted on the rails, a frame spanning the slides and having pivotal connections with the latter, a disk having a sliding mounting on the frame and formed on its upper face with indications corresponding to the points of the compass, and an indicator having a pivotal mounting on the disk at the center of the latter, the frame where it connects with the slides being provided with indicators lying in the vertical plane of the central longitudinal axis of the frame.

RUPERT B. McILROY.
LESLIE E. BAKER.